United States Patent
Ohtake et al.

[11] Patent Number: 5,869,136
[45] Date of Patent: *Feb. 9, 1999

[54] METHOD OF MANUFACTURING A CHEMICALLY ADSORBED MULTILAYER FILM

[75] Inventors: Tadashi Ohtake, Neyagawa; Norihisa Mino, Settu; Kazufumi Ogawa, Hirakata, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 12,753

[22] Filed: Feb. 3, 1993

[30] Foreign Application Priority Data

Feb. 27, 1992 [JP] Japan .................... 4-041253

[51] Int. Cl.$^6$ ........................................ B05D 1/36
[52] U.S. Cl. ................. 427/255.7; 427/333; 427/341; 427/353; 427/407.2; 427/409
[58] Field of Search .................. 427/333, 337, 427/340, 341, 352, 353, 354, 407.2, 409, 255.7

[56] References Cited

U.S. PATENT DOCUMENTS

| 4,539,061 | 9/1985 | Sagiv ........................ 156/278 |
| 5,552,236 | 9/1996 | Ohtake et al. .................. 428/692 |

FOREIGN PATENT DOCUMENTS 0 437 278   7/1991   European Pat. Off. .
0 481 362 A2  10/1991   European Pat. Off. .
0 484 746    5/1992   European Pat. Off. .

OTHER PUBLICATIONS

J. Am. Chem. Soc.,vol. 105, No. 3, pp. 674–676 (1983), Lucy Netzer and Jacob Sagiv.

Thin Solid Films, 132, pp. 135–151 (1985), Rivka Maoz and Jacob Sagiv.

Thin Solid Films, 132. pp. 153–162 (1985), M. Pomerantz and A. Segmüller.

Langmuir, vol. 6 No. 4, pp. 851–856 (1990), K. Ogawa, N. Mino, H. Tamura & M. Hatada.

*Primary Examiner*—Erma Cameron
*Attorney, Agent, or Firm*—Morrison & Foerster LLP

[57] ABSTRACT

A chemically adsorbed multilayer film is formed through the process of replacing a halogen atom on the surface of a chemically adsorbed film with an alkaline metal or changing the halogen atom to a Grignard group by Grignard reaction. This manufacturing method does not disrupt the molecules of the chemically adsorbed film, is easy to perform, low in cost and is safe. After replacing the halogen (for example, Br) on the surface of the film with an alkaline metal such as Li, a condensation reaction including a dealkalihalide reaction is promoted by contacting the chemically adsorbed film with an adsorbent, such as a chemical adsorbent—containing a halosilane group at one end of a molecule—dissolved in a nonaqueous solvent. A chemically adsorbed multilayer film is then formed by reacting the chemically adsorbed film with chemical absorption composition and with water after removing unreacted adsorbents using a nonaqueous solution.

13 Claims, 4 Drawing Sheets

METHOD OF MANUFACTURING A CHEMICALLY ADSORBED MULTILAYER FILM

FIELD OF THE PRESENT INVENTION

The invention relates to a method of manufacturing a chemically adsorbed multilayer film. More particularly, the invention relates to a method of manufacturing a chemically adsorbed multilayer film, which includes replacing halogen on the adsorbed film with an alkaline metal or changing the halogen to a Grignard group by Grignard reaction.

BACKGROUND OF THE INVENTION

Current methods used for manufacturing a chemically adsorbed multilayer film include cumulation (built-up) methods, mentioned, for example, in page 851 of the sixth volume of Langmuir (K. Ogawa et al., Langmuir, 6, 851 (1990)) and page 201 of the one hundred first volume of Journal of Colloid Interface Science (J. Gun et al., Journal of Colloid Interface Science, 101, 201 (1984)). The cumulation (built-up) methods include repetitions of the following process:

forming a monomolecular film by a dehydrochlorination reaction between a chlorosilyl group of a chemical adsorbent, which is a linear molecule having the chlorosilyl group at one end and a double bond at the other end, with a group on the surface of the substrate such as a hydroxyl group;

creating reactive hydrogen atoms by modifying the double bond either by treating it with oxidizing agents such as potassium permanganate or irradiating it with an electron beam.

Reactive hydrogen atoms also can be made by replacing the double bond with an amino group by irradiating a polymer film having the double bond with an electron beam in a nitrogen atmosphere, thereby forming a multilayer film.

However, the above-noted method of using an electron beam is problematic in that it requires an expensive large-scale apparatus. Also, a film is likely to be disrupted due to the subtle changes in radiation intensity of an electron beam. Moreover, severe risks are involved in the operation.

The method of treating with oxidizing agents, on the other hand, has a problem in that an unsaturated bond is not likely to be oxidized when the unsaturated bond is located on the surface of the monomolecular film (that is, the end of a monomolecular chemical adsorbent). Due to the usage of strong oxidizing agents, moreover, there is a problem in that the Si—C bond is likely to be broken.

SUMMARY OF THE INVENTION

An objective of the invention is to provide a method of manufacturing a chemically adsorbed multilayer film, which does not disrupt the molecules of the film, is easy to perform, low in cost and is safe, thereby solving the above-noted problems.

In order to accomplish the above objective, the method of manufacturing a chemically adsorbed multilayer film in the invention includes:

forming a chemically adsorbed film by contacting a substrate surface with a chemical adsorbent which has one or more halogen atoms and functional groups selected from the groups in the following Formulas [1]–[5] and a cyano group on the substrate surface;

—A$_1$X$_m$  Formula [1]

where X represents halogen, A$_1$ represents Si, Ge, Sn, Ti or Zr, n represents 1,2,3 or 4.

—A$_2$(OR)$_m$  Formula [2]

where OR represents alkoxyl halogen, A$_2$ represents Si, Ge, Sn, Ti, C or Zr, m represents 1,2,3 or 4.

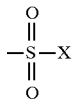   Formula [3]

where X represents halogen.

   Formula [4]

where X represents halogen.

   Formula [5]

where A$_3$ represents O or N.

replacing the halogen atom of the chemically adsorbed film with an alkaline metal composition or changing the halogen atom to a Grignard group;

reacting the alkaline metal composition with a chemical adsorption composition that includes a functional group, selected from the groups shown in the above formulas [1]–[5], a carbonyl, aldehyde, carboxyl, acyl, amide, or ester group.

In case the chemically adsorbed composition contains one or more halogens, the above treatments are repeated as many times as the number of layers to be built-up.

It is preferable in this invention that a chemical adsorption composition is bonded to a substrate and a formed layer through at least one atom selected from the group consisting of Si, Ge, Sn, Ti, Zr, C and S.

It is preferable in this invention that the chemical adsorption composition includes one or more hydrocarbon or fluorocarbon chains in its principal chain.

It is preferable in this invention that the chemical adsorption composition includes one or more unsaturated functional groups in its principal chain.

It is preferable in this invention that an aprotic solvent is used to wash away non-reactants after forming the chemically adsorbed film.

It is preferable in this invention that the chemically adsorbed film is formed by a condensation reaction.

It is preferable in this invention that the chemically adsorbed film is formed by dipping and holding a substrate in the solution containing a chemical adsorption composition.

It is preferable in this invention that the film is formed by contacting the substrate with a gaseous-phase molecule.

Based on the method of manufacturing a chemically adsorbed built-up film in the invention, which is to form the film through the process of replacing the halogen atom on the surface of the film with an alkaline metal atom or changing the halogen atom to a Grignard group by Grignard reaction, the molecules on the film are not likely to be disrupted, and the reaction operation is easy, safe and low in cost. Unlike other current methods requiring the use of an electron beam, this method requires only a simple reaction apparatus. In addition, the reaction operation can be easily accomplished without any problems to be considered other than the removal of water from the reaction system.

DETAILED DESCRIPTION OF THE INVENTION

Figure 1:
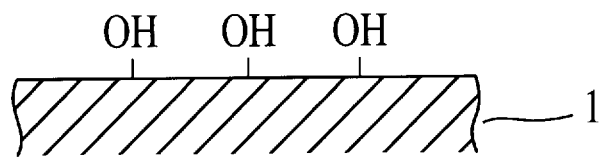
FIG. 1 is a model view, enlarged from a molecular level, showing the surface of a substrate of example 1 according to the invention.
Figure 2:
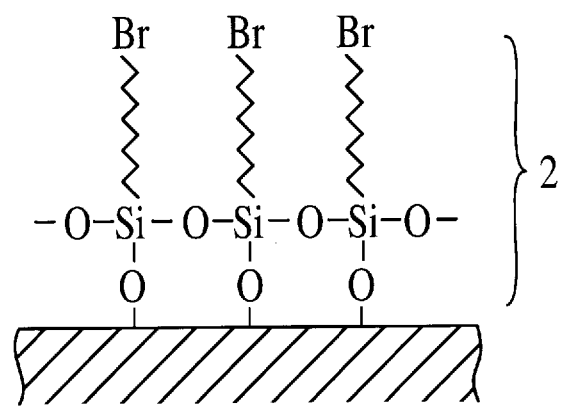
FIG. 2 is a model view, enlarged from a molecular level, showing the chemically adsorbed monomolecular film of example 1 according to the invention.

A chemically adsorbed film having one or more halogen atoms at the end of the molecules of the film is formed on the surface of a substrate having active hydrogens (such as a hydroxyl group, an amino group and an imino group) or an alkaline metal, by a chemical adsorption method.

More specifically, a chemically adsorbed film is formed by the following procedures:

dissolving a chemical adsorbent having the functional groups shown in Formulas [1]–[5] or a cyano group at one end of the adsorbent and a halogen atom at the other end of the adsorbent, in an aprotic solvent, thereby creating an adsorbent solution;

contacting a substrate with the adsorbent by any of several methods including dipping and holding, spraying, and gaseous-phase adsorption methods;

reacting the active hydrogen or the alkaline metal of the substrate with the functional group of the chemical adsorbent, thereby creating a dehydrohalogenation, alkalihalide reaction, alcohol elimination reaction or the like due to the contact;

removing unbonded adsorbent by using a nonaqueous solution; and reacting with water, to create the chemically adsorbed film.

A chemically adsorbed multilayer film can then be formed by the following additional procedures:

replacing the halogen on the surface of the chemically adsorbed film with an alkaline metal or alternatively changing the halogen to a Grignard group by Grignard reaction;

reacting the film with the chemical adsorbent which has at least one functional group chosen from the functional groups shown in Formulas [1]–[5], a carbonyl, aldehyde, carboxyl, acyl, amide, or ester group; and fixing the chemical adsorbent on the surface of the chemically adsorbed film, thereby forming a chemically adsorbed built-up film.

After replacing the halogen atom on the surface of the film with the alkaline metal and contacting the film with the chemical adsorbent containing at least one functional group chosen from the functional groups shown in Formulas [1]–[5], a carbonyl, aldehyde, carboxyl, acyl, amide or ester group, a haloalkaline metal falls away. Therefore, the chemical adsorbent can be bonded to the film by covalent bonding. Similarly, after using Grignard reaction and contacting the film with the chemical adsorbent containing at least one functional group chosen from the functional groups shown in Formulas [1]–[5], a carbonyl, aldehyde, carboxyl, acyl, amide or ester group, XMgX' (X and X' as halogens) falls away, or other reactions may occur. As a result, the chemical adsorbent is bonded to the film by covalent bonding.

More specifically, a molecule where at least one functional group chosen from the functional groups shown in Formulas [1]–[5], a carbonyl, aldehyde, carboxyl, acyl, amide or ester group is bonded only to the hydrocarbon chain or a molecule where at least one functional group chosen from the functional groups shown in Formulas [1]–[5], a carbonyl, aldehyde, carboxyl, acyl, amide or ester group, is bonded to the hydrocarbon chain, including an aromatic ring, a heterocyle, a metal, etc., which, for instance, are used as chemical adsorbents.

In addition, a Langmuir-Blodgett film, a spincoat film, a cast film and a chemically adsorbed film can be utilized as the film receiving the built-up. In terms of resistance against chemical reaction, however, the chemically adsorbed film is the most preferable film.

A replaced or transformed halogen atom on the film, receiving a chemical adsorption in the invention, can be Cl, Br or I. Cl is preferable in terms of reactive properties. However, the same chemically adsorbed multilayer film can be formed with either Br or I.

Moreover, it is possible to build-up a monomolecular film by adding a washing procedure, which removes unreacted chemical adsorbents after formation of the multilayer. In terms of practicality, the building-up of a monomolecular film can usually provide a quite sufficient function, which is preferable in some cases. Either a liquid-phase method or a gaseous-phase method is used for chemical adsorption. However, in terms of the density of an adsorbed molecule as well as simplicity and ease of operation, the liquid-phase method is generally preferable. However, even in case of the liquid-phase method, if the number of carbon atoms in the alkyl group of the adsorbent is more than 25, the melting point shifts from 80° C. to above 90° C. In this case, a solution is used in which an adsorbent is dissolved in a non-aqueous solution such as hexadecane-chloroform.

When one hydrogen atom of an alkyl group of the adsorbent is replaced with a fluorine atom, a water- and oil-repelling property is given to the film. And for instance, in an unsaturated bond like a C=C bond, a much stronger chemically adsorbed multilayer film can be formed through the process of polymerizing the adsorbed film. In an unsaturated bond such as of triple combinations of a carbon-a carbon or the combinations of a carbon-a nitrogen, the film can not only be strengthened but also provided with a conductive property through the process of polymerization. Therefore, depending on the functions of the alkyl group, various properties can be added to the chemically adsorbed multilayer film of the invention.

The method of manufacturing a chemically adsorbed multilayer film of the invention will now be explained specifically through the following examples 1–5 and comparative example 1 by using FIGS. 1–7.

EXAMPLE 1

As shown in FIG. 1, a glass substrate 1 was used as a hydrophilic substrate. After being washed with an organic solvent and dried, the substrate was dipped and held in a solution prepared by dissolving 3% by weight of (8-bromooctyl)trichlorosilane in a mixed solvent containing a four-to-one weight ratio of hexadecane and chloroform at room temperature for 1.5 hours. Due to this treatment, a composition as shown in Formula [6] was created, which formed a chemically adsorbed film on the glass substrate 1.

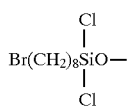

Formula [6]

After washing with a nonaqueous solvent, chloroform, for 15 minutes and with water for 15 minutes, the whole surface of the substrate reacted to form a composition as shown in Formula [7]. In addition, a chemically adsorbed monomolecular film 2, shown in FIG. 2, was formed. This monomolecular film was firmly fixed to the substrate, and possessed a good water-repelling property.

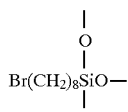

Formula [7]

Figure 3:
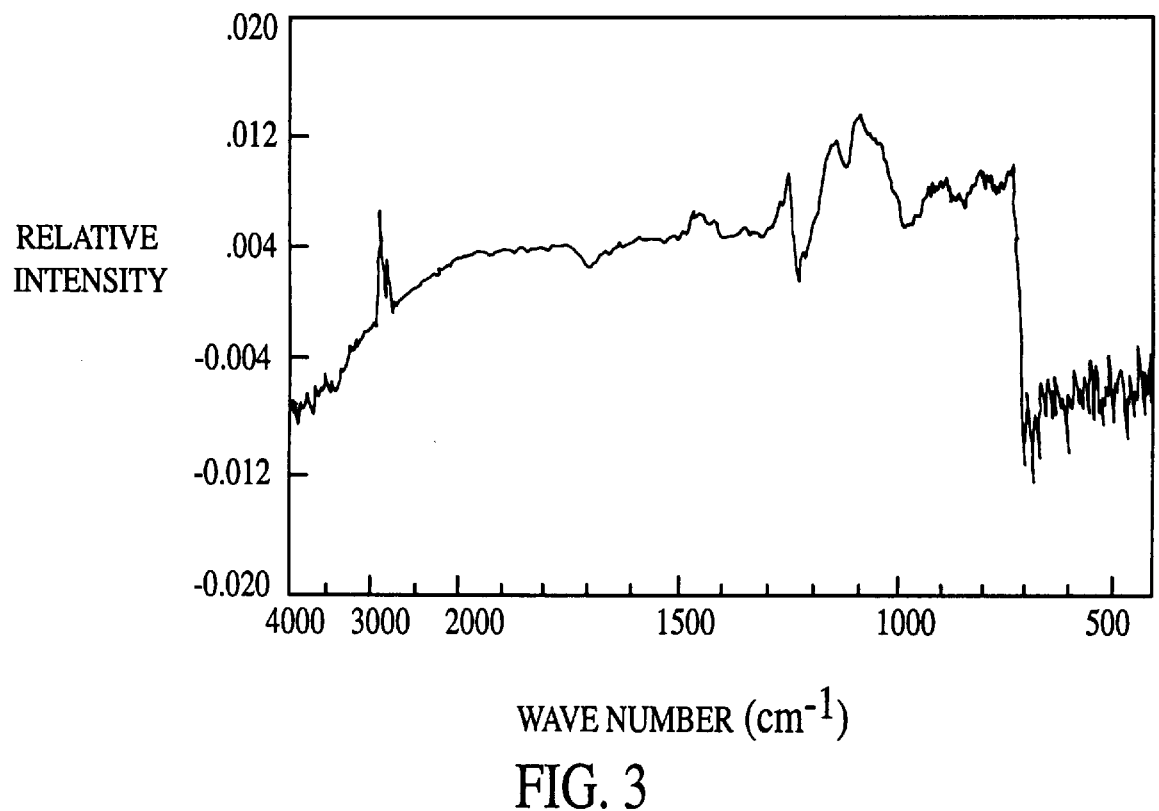
FIG. 3 is a Fourier transform infrared absorption spectrum of the chemically adsorbed monomolecular film of example 1 according to the invention.

As shown in FIG. 3, the particular signals were obtained for this structure at 2920–2860 (reversion: —$CH_2$—), 1470 (reversion: —$CH_2$—), 1440 (reversion: Br—C), 1240 (reversion: Si—C) and 1080 (reversion: Si—O) $cm^{-1}$ by Fourier transform infrared spectral (FTIR) measurement, thereby confirming the formation of the film.

The method of manufacturing a chemically adsorbed film on the monomolecular film 2 comprised the following stages:

dipping and holding the substrate having the monomolecular film 2 in 50 ml of n-hexane in a dry nitrogen atmosphere at room temperature;

adding 5 mg of powdered metal lithium and reacting the substrate for one hour;

replacing the Br atom on the monomolecular film with a Li atom;

rinsing the reacted substrate with dry n-hexane;

adding the reacted substrate to a chloroform hexadecane solution containing 10% by weight of (8-bromooctyl) trichlorosilane and reacting the substrate at room temperature for 1.5 hours;

reacting the Li atom with the Si—Cl of (8-bromooctyl) trichlorosilane, thereby eliminating LiCl;

creating a composition as shown in Formula [8], thereby forming a chemically adsorbed film on the monomolecular film 2.

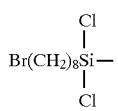

Formula[8]

The whole surface of the substrate reacted to form a composition as shown in Formula [9] which incorporated a chemically adsorbed monomolecular film containing a Br atom on the surface after being washed with chloroform for 15 minutes and with water for 15 minutes. This built-up, multilayer film 3 was firmly fixed to the substrate, and possessed a good water-repelling property.

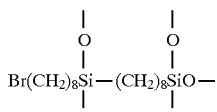

Formula[9]

Figure 5:
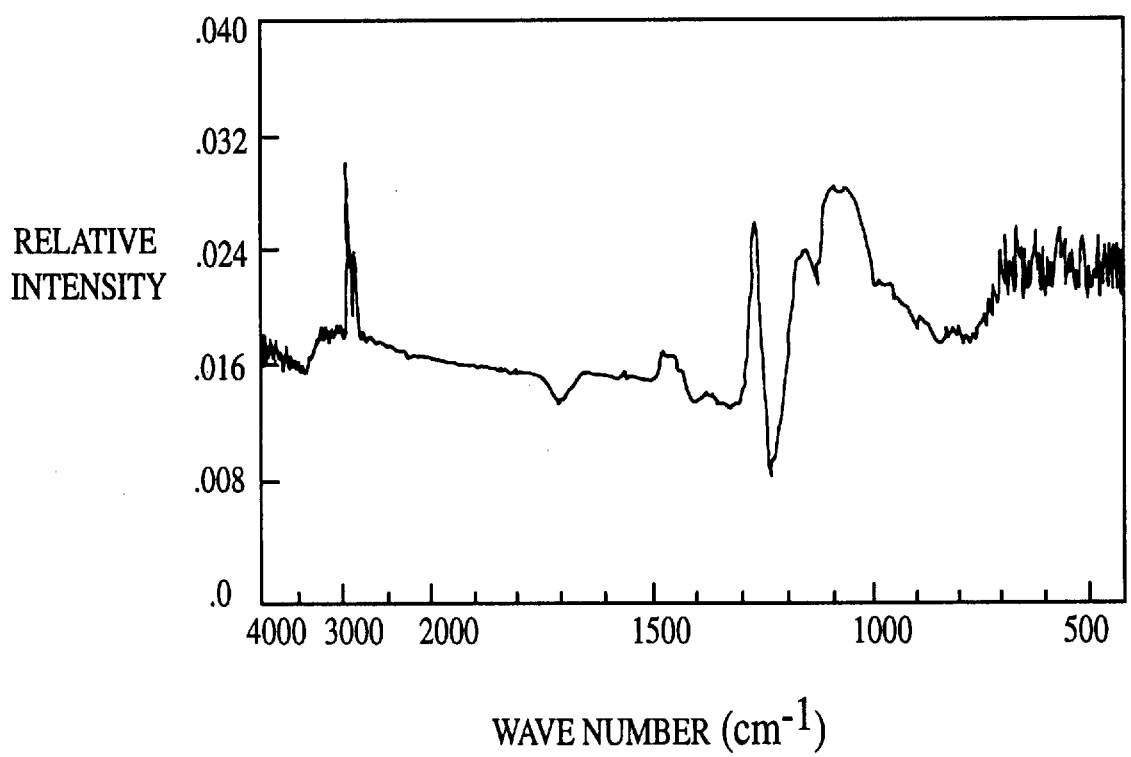
FIG. 5 is a Fourier transform infrared absorption spectrum of the chemically adsorbed multilayer film of example 2 according to the invention.

As shown in FIG. 5, according to FTIR measurement, each signal at 2920–2860 (reversion: —$CH_2$—), 1470 (reversion: —$CH_2$—), 1240 (reversion: Si—C) and 1080 (reversion: Si—O) $cm^{-1}$ became doubled, thereby confirming the cumulation of a multilayer film.

EXAMPLE 2

As a hydrophilic substrate, the glass substrate 1 in example 1 was used, and as in example 1, monomolecular film 2 was formed on the plate.

By receiving the same signals as in example 1, the formation of the monomolecular film was confirmed by FTIR measurement.

A chemically adsorbed film was then formed on monomolecular film 2 by the following procedures:

dipping and holding the substrate with the monomolecular film in 50 ml of dry ether in a dry nitrogen atmosphere;

adding 10 mg of powdered magnesium and 10 mg of iodine—a reaction initiator—and reacting the substrate for one hour;

rinsing the reacted substrate with dry ether;

creating Grignard reaction on the monomolecular film, to change a Br atom to MgBr;

adding the reacted substrate to a solution prepared by dissolving 3% by weight of (8-bromooctyl) trichlorosilane in a mixed solvent containing a four-to-one weight ratio of hexadecane and chloroform, and reacting the plate at room temperature for 1.5 hours;

reacting MgBr with the Si—Cl of (8-bromooctyl) trichlorosilane, thereby separating ClMgBr;

creating a composition as shown in Formula [10], and forming a chemically adsorbed film on monomolecular film 2.

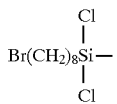

Formula[10]

Figure 4:
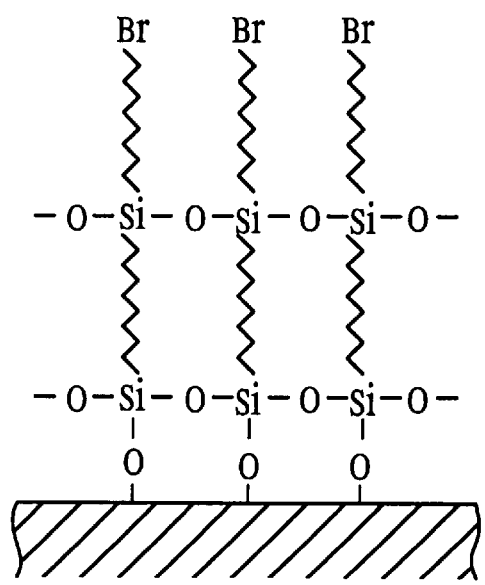
FIG. 4 is a model view, enlarged from a molecular level, showing the chemically adsorbed multilayer film of example 1 according to the invention.

After being washed with a nonaqueous solvent, chloroform, for 15 minutes and with water for additional 15 minutes, the entire surface of the substrate reacted to form a composition as shown in Formula [11]. And as shown in FIG. 4, a chemically adsorbed monomolecular film containing a Br atom was built upon the surface of the substrate. This built-up, multilayer film was firmly fixed to the substrate, and possessed a good water-repelling property.

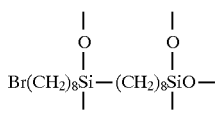

Formula[11]

As shown in FIG. 5, each signal at 2920–2860 (reversion: —$CH_2$—), 1470 (reversion: —$CH_2$—), 1240 (reversion: Si—C) and 1080 (reversion: Si—O) $cm^{-1}$ became nearly doubled, according to FTIR measurement, thereby comfirming the cumulation of a multilayer film.

EXAMPLE 2

As in example 1, a monomolecular film 3 was formed by using the glass substrate 1 in example 1 as a hydrophilic substrate.

The formation of the film was confirmed by receiving the same signals as in example 1 by FTIR measurement.

The formation of a chemically adsorbed film on the monomolecular film 2 comprised the following stages:

dipping and holding the substrate with monomolecular film in 50 ml of n-hexane in a dry nitrogen atmosphere at room temperature;

adding 5 mg of powdered lithium and reacting the substrate for one hour;

rinsing the reacted substrate with n-hexane;

replacing the Br atom on the monomolecular film with a Li atom;

adding 10 ml of ethanesulfonyl chloride and reacting the plate at 40° C. for 10 minutes;

reacting the Li atom with the S—Cl of ethanesulfonyl chloride, thereby eliminating LiCl;

creating a composition as shown in Formula [12], thereby forming a chemically adsorbed film on monomolecular film 2.

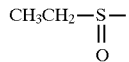  Formula[12]

Figure 6:
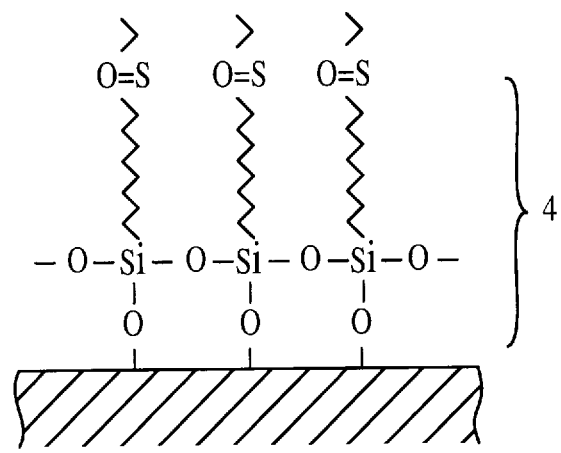
FIG. 6 is a model view, enlarged from a molecular level, showing the chemically adsorbed multilayer film of example 3 according to the invention.
Figure 7:
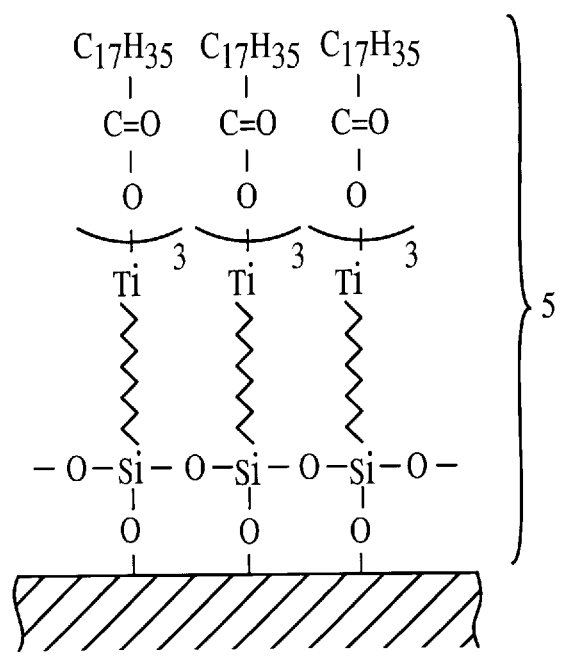
FIG. 7 is a model view, enlarged from a molecular level, showing the chemically adsorbed multilayer film of example 5 according to the invention.

After washing with a nonaqueous solvent, chloroform, for five minutes and with water for five minutes, the entire surface of the substrate reacted to form a composition as shown in Formula [12]. In addition, the chemically adsorbed monomolecular film as shown in FIG. 6 was built up to form a multilayer film. This built-up film 4 was firmly fixed to the substrate, and possessed a good water-repelling property.

According to FTIR measurement, the appearance of an additional large signal at 1090 (reversion: S=O) cm$^{-1}$ was found, thereby confirming the cumulation of the multilayer film.

EXAMPLE 4

The glass substrate 1 of example 1 was used as a hydrophilic substrate, and as in example 1, monomolecular film 3 was formed.

The formation of the film was confirmed by receiving the same signals as in example 1 by FTIR measurement.

A chemically adsorbed film was then formed on monomolecular film 2 through the following procedures:

dipping and holding the substrate with the monomolecular film in 50 ml of dry ether at room temperature in a dry nitrogen atmosphere;

adding 10 mg of powdered magnesium and 1 mg of iodine—a reaction initiator—and reacting the substrate for one hour;

rinsing the reacted substrate with dry ether;

replacing the Br atom on the monomolecular film with a Li atom;

adding the reacted substrate to 10 ml of ethanesulfonyl chloride, and reacting the substrate at 40° C. for 10 minutes;

reacting the Li atom with the S—Cl of ethanesulfonyl chloride, thereby eliminating LiCl;

creating a composition as shown in Formula [13], thereby forming a chemically adsorbed film on monomolecular film 2.

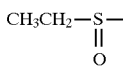  Fromula[13]

After washing with a nonaqueous solvent, chloroform, for five minutes and with water for five minutes, the whole surface of the substrate reacted to form a composition as shown in Formula [13], and a chemically adsorbed monomolecular film as in FIG. 6 was built up as a multilayer film. This multilayer film was firmly fixed to the substrate, and possessed a good water-repelling property.

According to FTIR measurement, the appearance of an additional new large signal at 1090 (reversion: S=O) cm$^{-1}$ was found, thereby confirming the cumulation of a film.

EXAMPLE 5

The substrate 1 of example 1 was used as a hydrophilic substrate, and monomolecular film 3 was formed as in example 1.

The formation of the film was confirmed by receiving the same signals as in example 1 by FTIR measurement.

A chemically adsorbed film was then formed on monomolecular film 2 as shown in the following procedures:

dipping and holding the substrate with the monomolecular film in 50 ml of dry n-hexane in a dry nitrogen atmosphere;

adding 5 mg of powdered lithium and reacting the plate for one hour;

rinsing the reacted plate with n-hexane;

replacing the Br atom on the monomolecular film with a Li atom;

adding 15 ml of $(C_{17}H_{35}COO)_3TiOCH(CH_3)_2$, and reacting the substrate at room temperature for one hour;

reacting the Li atom with $TiOCH(CH_3)_2$ of $(C_{17}H_{35}COO)_3TiOCH(CH_3)_2$, thereby eliminating $LiOCH(CH_3)_2$;

creating a composition as shown in Formula [14], thereby creating a chemically adsorbed film on monomolecular film 2.

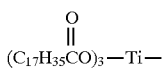  Formula[14]

After washing with a nonaqueous solvent, chloroform, for five minutes and with water for five minutes, the whole surface of the substrate reacted to form a composition as shown in Formula [13]. In addition, the chemically adsorbed monomolecular film as in FIG. 7 was built up to form a multilayer film. The built-up film 5 was firmly fixed to the substrate, and possessed a good water-repelling property.

According to FTIR measurement, each signal at 2920–2860 (reversion: —CH$_2$—) and 1470 (reversion: —CH$_2$—) cm$^{-1}$ increased nearly seven fold. An additional signal also appeared at 1750 (reversion:C=O) cm$^{-1}$ thereby confirming the cumulation of a film.

Comparative Example 1

A further attempt was made, similar to the previous examples, to build up a monomolecular film in this comparative example by the following procedures:

dipping and holding a hard polyvinyl chloride film 6 having a thickness of 50 μm in 50 ml of dry n-hexane at room temperature in a nitrogen atmosphere;

adding 5 mg of powdered metal lithium and reacting the film for two hours;

rinsing the reacted film with dry n-hexane;

adding the reacted film to a chloroform-hexadecane solution containing 3% by weight of (8-bromooctyl) trichlorosilane and reacting the film at room temperature for 1.5 hours;

washing with chloroform for 15 minutes and with water for an additional 15 minutes.

Due to the above-noted treatments, a multilayer chemically adsorbed monomolecular film containing a Br atom on the surface was supposed to be formed as in examples 1–5. However, it was confirmed that the monomolecular film was hardly built upon the film due to the fact that only a small Si spectrum was found by ESCA analysis. Also, there was almost no change in the result even if the time for the adsorption reaction was increased to 15 hours.

As explained above, according to the results of examples 1–5, the method used in this invention is quite easy, safe, and low in cost; therefore, it is confirmed that the method is good for general use.

Moreover, as explained above, the method does not disrupt the molecules which form the chemically adsorbed film, and is easy to perform, low in cost and safe. This is due to the fact that the method forms a chemically adsorbed multilayer film through the process of replacing a halogen on the surface of a chemically adsorbed film with an alkaline metal and changing the halogen to a Grignard group by Grignard reaction.

The invention may be embodied in other specific forms without departing from the spirit or essential characteristics thereof. The present embodiment is to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method of manufacturing a chemically adsorbed multilayer film comprising:

(a) forming a first chemically adsorbed film by reacting a functional group on a substrate surface with a chemical adsorbent and reacting said chemical adsorbent with water molecules, said chemical adsorbent having one or more halogen atoms and one or more functional groups selected from the groups consisting of Formula (1), Formula (2), Formula (3), Formula (4), Formula (5) and a cyano group, on the substrate surface, wherein Formula (1) is

where X represents halogen, $A_1$, represents Si, Ge, Sn, Ti or Zr, n represents 1, 2, 3 or 4;

Formula (2) is

where OR represents alkoxyl halogen, $A_2$ represents Si, Ge, Sn, Ti, C or Zr, m represents 1, 2, 3 or 4;

Formula (3) is

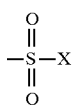

where X represents halogen;

Formula (4) is

where X represents halogen;

Formula (5) is

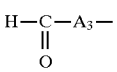

where $A_3$ represents O or N;

(b) replacing the halogen atom of said first chemically adsorbed film with an alkaline metal composition or changing the halogen atom to a Grignard group by a Grignard reaction;

(c) reacting the alkaline metal composition or a Grignard group with a chemical adsorption composition and reacting said chemical adsorbent with water molecules, said chemical adsorption composition comprising non-reactants and a functional group selected from the groups consisting of Formula (1), Formula (2), Formula (3), Formula (4), Formula (5) and a cyano group to form a second chemically adsorbed film on said first chemically adsorbed film.

2. The method of manufacturing a chemically adsorbed multilayer film according to claim 1, wherein said chemical adsorption composition is bonded to said substrate through at least one atom selected from the group consisting of Si, Ge, Sn, Ti, Zr, C and S.

3. The method of manufacturing a chemically adsorbed multilayer film according to claim 1, wherein said chemical adsorption composition includes either a hydrocarbon or a fluorocarbon group in a principal chain of said chemical adsorption composition.

4. The method of manufacturing a chemically adsorbed multilayer film according to claim 1, wherein said chemical adsorption composition includes one or more unsaturated functional groups in a principal chain of said chemical adsorption composition.

5. The method of manufacturing a chemically adsorbed multilayer film according to claim 1, wherein an aprotic solvent is used to wash away non-reactants after forming said second chemically adsorbed film.

6. The method of manufacturing a chemically adsorbed multilayer film according to claim 1, wherein said first chemically adsorbed film is formed by a condensation reaction.

7. The method of manufacturing a chemically adsorbed multilayer film according to claim 1, wherein said second chemically adsorbed film is formed by dipping and holding said substrate in a solution containing said chemical adsorption composition.

8. The method of manufacturing a chemically adsorbed multilayer film according to claim 1, wherein said first chemically adsorbed film is formed by contacting said substrate with a gaseous-phase molecule.

9. The method of manufacturing a chemically adsorbed multilayer film according to claim 1, wherein said first chemically adsorbed film is reacted under a gaseous-phase condition.

10. The method of manufacturing a chemically adsorbed multilayer film according to claim 1, further comprising subsequent repetition in series of steps (b) and (c).

11. The method of manufacturing a chemically adsorbed multilayer film according to claim 1, wherein said second chemically adsorbed film is formed by a condensation reaction.

12. The method of manufacturing a chemically adsorbed multilayer film according to claim 1, wherein said chemical adsorption composition is bonded to said first chemically adsorbed film through at least one atom selected from the group consisting of Si, Ge, Sn, Ti, Zr, C and S.

13. The method of manufacturing a chemically adsorbed multilayer film according to claim 1, wherein said first chemically adsorbed film is bonded to said substrate through at least one atom selected from the group consisting of Si, Ge, Sn, Ti, Zr, C and S.

* * * * *